(12) United States Patent
Hiroshige et al.

(10) Patent No.: US 6,332,114 B1
(45) Date of Patent: Dec. 18, 2001

(54) EVALUATION SYSTEM FOR DETERMINING A PERCENT A PRODUCT IS DEFECTIVE USING A NETWORK

(75) Inventors: Yuzo Hiroshige, Yokohama; Yoshiaki Ichikawa, Hitachi, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/685,904

(22) Filed: Oct. 11, 2000

Related U.S. Application Data

(63) Continuation of application No. 09/600,254, filed as application No. PCT/JP98/05687 on Dec. 16, 1998.

(30) Foreign Application Priority Data

Jan. 20, 1998 (JP) .................................................. 10-008284

(51) Int. Cl.[7] .................................................. G06F 17/50
(52) U.S. Cl. .................................................. 702/81; 702/182
(58) Field of Search ........................ 700/95, 96, 108; 702/81, 84, 182

(56) References Cited

U.S. PATENT DOCUMENTS

| | | | |
|---|---|---|---|
| 5,523,960 | * | 6/1996 | Jeong .................................. 364/578 |
| 5,572,430 | * | 11/1996 | Akasaka et al. ................. 364/468.01 |
| 5,586,022 | * | 12/1996 | Arimoto et al. ................. 364/468.03 |
| 5,717,598 | * | 2/1998 | Miyakawa et al. ............. 364/468.09 |
| 5,761,064 | * | 6/1998 | La et al. .......................... 364/468.17 |
| 5,907,488 | * | 5/1999 | Arimoto et al. ................. 364/468.03 |
| 5,933,350 | * | 8/1999 | Fujimoto et al. ............... 364/468.28 |
| 5,978,751 | * | 11/1999 | Pence et al. .......................... 702/179 |
| 5,980,084 | * | 11/1999 | Jones et al. ...................... 364/468.01 |
| 6,065,857 | * | 5/2000 | Hazama et al. ................. 364/468.01 |
| 6,115,643 | * | 9/2000 | Stine et al. .......................... 700/110 |

FOREIGN PATENT DOCUMENTS

| | | |
|---|---|---|
| 469703 | 3/1992 | (JP) . |
| 4329473 | 11/1992 | (JP) . |
| 5128178 | 5/1993 | (JP) . |
| 7311792 | 11/1995 | (JP) . |
| 8115354 | 5/1996 | (JP) . |

* cited by examiner

*Primary Examiner*—Patrick Assouad
(74) *Attorney, Agent, or Firm*—Antonelli, Terry, Stout & Kraus, LLP

(57) ABSTRACT

An evaluation system of products which allows a plurality of users to execute an evaluation calculation using the same evaluation algorithm and evaluation data, without a manager. The evaluation system includes an evaluator system and an evaluation calculation system. The newest evaluation algorithm and evaluation data are managed in the evaluation calculation system, collectively, wherein the evaluator system executes the evaluation by connecting to the evaluation calculation system through a network.

12 Claims, 5 Drawing Sheets

FIG. 3

INFORMATION INPUT SCREEN ON TOTAL EVALUATION OBJECT PRODUCTS (OR ASSEMBLIES)

INFORMATION ON EVALUATION PRODUCT
- NAME
- MAX. SIZE (mm)
- UNIT OF WORKSHOP
- .
- ,

INFORMATION ON COMPARISON OBJECT PRODUCT
- NAME
- UNIT OF WORKSHOP
- EVALUATION RESULT 1
- EVALUATION RESULT 2
- .

[PARTS INFORMATION] [END OF INPUT]

FIG. 4

INFORMATION INPUT SCREEN ON EVALUATION OBJECT PARTS (OR ASSEMBLIES)

INFORMATION ON EVALUATION PARTS
- NAME
- NUMBER OF PARTS
- SIZE (mm)
- MASS (g)
- POSITION  ○ HIGH:LOW  ● REGULAR
- OPERATION MARK
- REPAIR MARK
- NUMBER OF REPETITIONS
- .
- .

INFORMATION ON COMPARISON OBJECT PART
- NAME
- EVALUATION RESULT 1
- EVALUATION RESULT 2
- .
- .
- .
- .
- .
- .
- .

[NEXT PART] [PREVIOUS PART] [PRODUCT INFORMATION] [END OF INPUT]

FIG. 5

| SELECTION MENU OF OPERATION MARKS ||
|---|---|
| MOVING OPERATION/OTHERS | OPERATION OF USING TOOLS |
| ↑ : MOVE IN UPPER DIRECTION | R : PEEL (WITH TOOL) |
| → : MOVE IN HORIZONTAL DIRECTION | ⊕ : USE OF SCREWDRIVER |
| ↓ : MOVE IN LOWER DIRECTION | u : CUT (ONE HAND TOOL) |
| r : PEEL (WITHOUT TOOL) | U : CUT (BOTH HAND TOOL) |
| T : REVERSE/HEADSTAND | . |
| F : HOLD | . |
| . | . |
| . | . |

FIG. 6

| SELECTION MENU OF REPAIR MARKS ||
|---|---|
| MOVING OPERATION/OTHERS | OPERATION OF USING TOOLS |
| n : SHORT DISTANCE | z : SCREW SIZE |
| h2 : NARROW PLACE | t : HARD SCREW |
| h3 : LIGHT INSERTION | + : SPECIAL SCREW |
| . | . |
| . | . |

EVALUATION SYSTEM FOR DETERMINING A PERCENT A PRODUCT IS DEFECTIVE USING A NETWORK

This is a continuation of application Ser. No. 09/600,254, filed Jul. 13, 2000 which is a 371 of PCT/JP98/05687 Filed Dec. 16, 1998.

TECHNICAL FIELD

The present invention relates to an evaluation system for evaluating easiness of assembling, probability of causing inferior or poor assembling, easiness of machining or processing, easiness of manufacturing, easiness of disassembling, easiness of recycling, etc., of products, assemblies for constructing the products or parts thereof, in particular for household electric appliances, office automation (OA) equipment or machines, etc.

BACKGROUND ARTS

In the conventional evaluation system for evaluating products, by operating on a separated computer is conducted input therein, individually, thereby processing from calculation up to display of the result thereof being performed within the same computer. Namely, it has the structure being totally depending upon the separated computer, but except for external memory apparatuses and/or outputting devices.

Also, in that instance, when transmitting a plurality of information being different in contents thereof, it is common to construct the system, so that a plural number of files on the results of calculations are made or prepared, then the contents of the files newly prepared are transmitted every time when such a requirement is made.

For the system for evaluating products, it is always required to execute the evaluations by using a newest information and/or system. However, for the product evaluation system at the present, since the system as a whole is stored or constructed within the separated computer, individually, renewal of the evaluation system must be conducted on the separated computers, respectively, in particular when the evaluation system is used at a plural number of locations, therefore the work for renewal operation thereof comes to be complicated and/or troublesome.

Also, when providing the different information of evaluation in plural, since the information is stored being divided into the plural number of files and the information is presented or shown by exchanging or selecting the file(s) to be presented depending upon the requirement, it means that there also exist also the file(s) storing the results of evaluation therein other than the file(s) presenting that information, in the computer which stores or construct the evaluation system therein, therefore it has a problem in a view point of leakage of information.

SUMMARY OF THE INVENTION

Then, a first object, according to the present invention, is to provide an evaluation system, wherein the computer for inputting data for use in the evaluation is constructed independently from the computer for executing the calculation, thereby realizing the evaluation while always using the newest information/system therein.

Also, a second object, according to the present invention, is to provide an evaluation system, wherein the calculation results are provided, but without producing excessive file(s) that will be a cause of the leakage of information, as a countermeasure to solve the problem in view of security, which occurs when adopting a method wherein the input information is calculated after being transmitted to other computer(s).

Further, according to the present invention, a third object is to provide an evaluation system, wherein the input of the data for use in evaluation is carried out by codes, for convenience of data transmission between the computer for inputting data for use in evaluation and the computer for executing the calculation thereof.

According to the present invention, for accomplishing the above-mentioned first object, there is provided an evaluation system for product, having: an input device for inputting evaluation information; and an evaluation device being connected with said input device through a network, wherein said input device comprises: a function of transmitting the evaluation information inputted therethrough to said evaluation device through said network, and said evaluation device has: a function of executing an evaluation calculation with using the evaluation information which is transmitted through said network; and a function of transmitting a result of execution on the evaluation calculation by said evaluation device to said input device through said network.

Also, for accomplishing the above-mentioned second object, in the above, wherein a plurality of pieces of evaluation results which are evaluated by said evaluation device are handled as one of output file.

Also, for accomplishing the above-mentioned second object, in the above, wherein an evaluation information being coded is used in the evaluation information to be inputted.

Also in the above, wherein an information depending upon tools or jigs in working time is included in the evaluation information to be inputted, thereby obtaining an improvement on accuracy in evaluation.

Also, as an example of the above-mentioned evaluation, there are listed up any one of easiness of assembling, probability of causing inferior or poor assembling, easiness of machining or processing, easiness of manufacturing, easiness of disassembling, easiness of recycling, etc., of said product, and a combination of those.

BRIEF DESCRIPTION OF THE DRAWINGS

FIG. 3 shows an example of an input screen according to the present invention;

FIG. 4 shows an other example of the input screen according to the present invention;

FIG. 5 shows an example of input information being coded, according to the present invention;

FIG. 6 shows an other example of the input information being coded, according to the present invention;

BEST MODE FOR CARRYING OUT THE INVENTION

Figure 1:
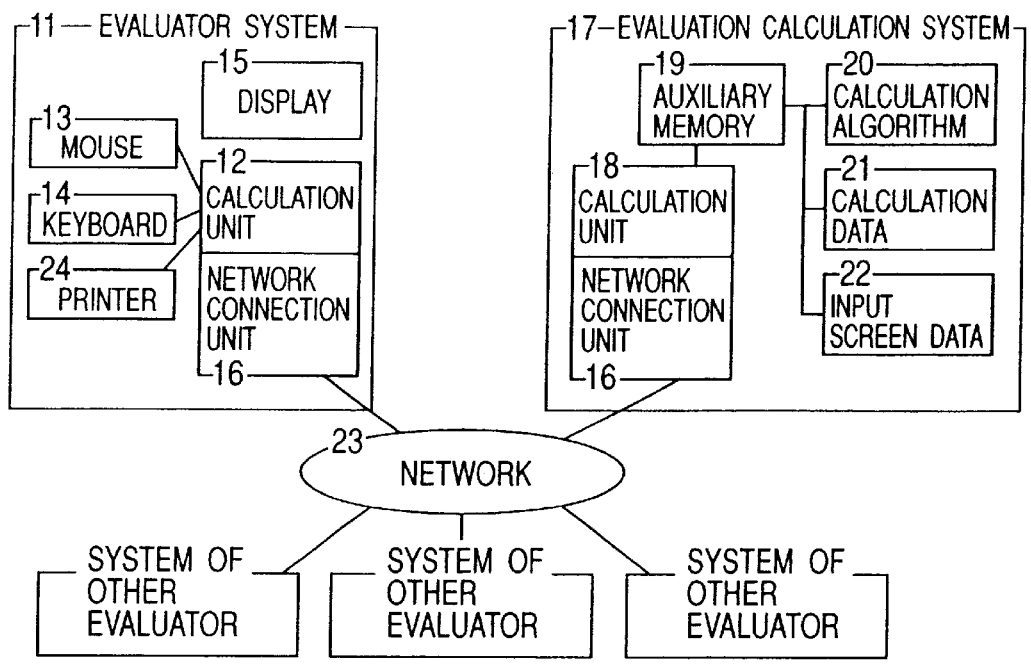
FIG. 1 shows an example of a total view of an evaluation system according to the present invention.

FIG. 1 shows an example of an evaluation system for realizing or accomplishing the present invention.

A reference numeral 11 indicates an evaluator system, and it comprises a calculation or processing unit 12, a mouse 13, an input device, such as a keyboard 14, etc., a displaying device, such as a display 15, etc., and a network connecting unit 16.

A reference numeral 17 indicates an evaluation calculation system, and it comprises a calculation or processing unit 18, an auxiliary memory 19, and the network connecting unit 16. Herein, in the auxiliary memory 19 are stored an operation algorithm 20, an operation data 21, and an input screen data 22, etc.

Here, for the evaluator system 11 is not necessarily needed the auxiliary memory, and for the evaluation calculation system 17 is not necessarily needed the input device and/or the displaying device.

In the structure of the present evaluation system, operation flow of the evaluation is as follows:

Transmission of a screen for use in input is prompted from the evaluator system 11 through the network 23 to the evaluation calculation system 17. The evaluation calculation system 17 transmits the input screen data 22 which is stored in the auxiliary memory 19 through the network 23. In the evaluator system 11, the input screen is displayed on the display 15 upon the basis of the input screen data 22 which is received. An evaluator carries out the input of the data for evaluation by using the input device. The data for use in evaluation is sent through the network 23 to the evaluation calculation system 17, every time when the input is made, when the screen is changed over, or when the instruction is made by the evaluator, etc. Upon completion of the input or the instruction from the evaluator, the evaluation calculation system 17 calls up the operation algorithm 20 and the operation data 21 which are memorized in the auxiliary memory 19, so as to execute the calculation for evaluation on the data which is transmitted through the network 23, and the result of this is stored or reserved temporarily into the auxiliary memory 19, as well as is sent through the network 23 to the evaluation calculation system 17. In the evaluation calculation system 17, the result of evaluation transmitted from the network 23 is indicated or shown on the display 15, etc. Further, it can be outputted to the output device, such as a printer 24, depending upon the necessity thereof.

Herein, as a means for transmitting the input screen data 22 from the evaluation calculation system 17 to the evaluator system 11, it may be sufficient that the data is transferred by means of the languages, such as HTML (HyperText Markup Language), etc., while such as Web browser, etc., which can interpret the HTML language is transferred to or used in the evaluator system 11. Also, as a means for transmitting the result of evaluation from the evaluation calculation system 17 to the evaluator system 11, it may be also to be transferred by using the HTML language, etc., in the same manner as for the input screen data 22.

The operation algorithm which is memorized in the auxiliary memory 19 may an algorithm for evaluating easiness of assembling, probability of causing inferior or poor assembling, easiness of machining or processing, easiness of manufacturing, easiness of disassembling, easiness of recycling, etc., of products, or may be one of combining some of them, or other algorithm(s). In any case, it is sufficient to be constructed so that the evaluation information necessary for the memorized calculation algorithm can be transmitted from the evaluator system 11 to the evaluation calculation system 17.

With such the system construction and steps for the evaluation, the evaluator is able to input the data for evaluation and to execute the calculation for evaluation, upon the basis of the newest input screen data 22, operating algorithm 20, and operation data 21, which are stored in the evaluation calculation system 17. With the present system structure, also it is possible to extend or expand the system, even in a case where a plural number of users exist for the evaluation system, only by constructing the system of the each user to have a function of requiring the transmission of the input screen data and a function of interpreting the formats of the input screen data 22 and the file(s) of the result of evaluation.

Further, with provision of functions in the evaluation calculation system 17, of deleting an intermediate or interim file(s) produced on the way of calculations, such as the file(s) of the calculation result which is contemporarily stored in the auxiliary memory 19, and/or the file(s) in which the input information is stored, for example in case where a predetermined time period is passed away from the production thereof, in particular when the instruction from the evaluator system 11 is shut down or when the connection of the network 23 is broken or down with the evaluator system 11, then the excessive file(s) causing the leakage of information can be excluded automatically, therefore it is possible to dissolve such the problem from the security view point, that occurs in the case of adopting the method wherein the input information is calculated after being transmitted to the other computer(s).

Figure 2:
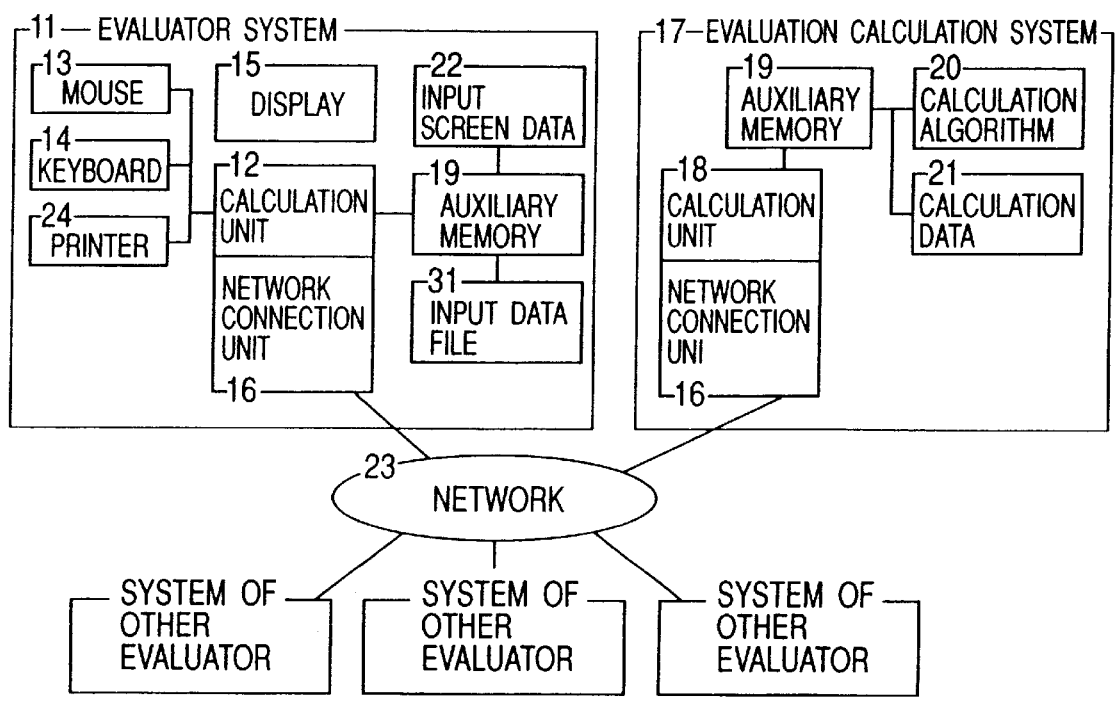
FIG. 2 shows an other example of the total view of the evaluation system according to the present invention.

FIG. 2 shows an other example of the evaluation system for realizing or accomplishing the present invention.

In the present system, the auxiliary memory 19 is provided in the processing unit 12 of the evaluator system 11, into which is stored the input screen data 22. As a result of this, the input screen data is not necessary to be within the evaluation calculation system 17.

With the structure of the present evaluation system, the flow of the evaluation is as follows:

When the evaluator calls up the input screen data 22 which is memorized in the auxiliary memory 19 of the evaluator system 11, the processing unit 12 indicates or displays the input screen on the display 15. The evaluator carries out the input of the data for evaluation by using the input device. The data for evaluation is memorized into the auxiliary memory 19 as the input data file 31, for example every time when being inputted, when the screen is changed over, or when the instruction is made by the evaluator, etc. upon the completion of the input or the instruction from the evaluator, the evaluator system 11 sends the input data file 31 through the network 23 to the evaluation calculation system 17. The evaluation calculation system 17 calls up the operation algorithm 22 and the calculation data 21, which are memorized in the auxiliary memory 19, so as to execute calculation for evaluation on the data which are transmitted through the network 23, and the result of this is stored or reserved temporarily into the auxiliary memory 19, as well as is sent through the network 23 to the evaluation calculation system 17. In the evaluation calculation system 17, the result of evaluation transmitted from the network 23 is indicated on the display 15, etc. Further, it is also possible to output it to the output device, such as a printer 24, depending upon the necessity thereof.

Also in this case, as a means for transmitting the result of evaluation from the evaluation calculation system 17 to the evaluator system 11, it may be sufficient that the data is transferred by means of the languages, such as HTML, etc., while such as the Web browser, etc., which can interpret the HTML language is transferred to or used in the evaluator system 11.

Further, as was mentioned previously, it is preferable from the view point of security, that the evaluation calculation system 17 deletes such the intermediate or interim file(s) produced on the way of calculations, such as the file(s) of the calculation result which are contemporarily stored in the auxiliary memory 19, and/or the file(s) in which the input information is stored, for example in case where a predetermined time period is passed away from the production thereof, in particular when the instruction is shut down from the evaluator system 11 or when the connection of the network 23 is broken down with the evaluator system 11.

Also, with such the system construction and steps for the evaluation, the evaluator is able to input the data for evaluation and to execute the calculation for evaluation, on the basis of the newest input screen data 22 and operation data 21 stored in the evaluation calculation system 17. Also with the present system structure, it is possible to extend or expand the system, even in a case where a plural number of users exist for the evaluation system, only by structuring the system of the each user to have a function of transmitting the input screen data and the input data, as well as a function of interpreting the format of the file(s) of result of evaluation.

The evaluation system shown in the FIG. 2 is different from the evaluation system shown in the FIG. 1, in an aspect that there is no necessity that it must be connected to the network 23 during the period when the data for evaluation is inputted in the evaluator system 11, since the data stored in the evaluator system 11 is used as the input screen data 22.

Further, also with the evaluator system shown in the FIG. 2, having the newest input screen data in the evaluation calculation system 17, wherein the input screen data 22 is transmitted through the network 23 into the auxiliary memory 19 of the evaluator system 11 just before executing the input of the evaluation data within the evaluator system 11, so as to perform the input with using the input screen data 22, thereby it is also possible to use the newest one of the input screen data 22.

FIG. 3 shows an example of the input screen of the present evaluation system. However, with this screen, it is possible to use the same one in the both systems, which are shown in the above FIGS. 1 and 2.

As the input information in the present evaluation system, it is information relating to a product to be evaluated and/or an assembly thereof as a whole, such as, the name or maximum sizes of the product and the assembly thereof, etc.

Herein, on the input screen, it is preferable to make the items which are needed to be inputted and the other items which are not necessarily needed to be inputted, distinctive from each other. Here, for the purpose of discriminating the items necessary to be inputted from the others, a shading of net-casting, etc., is treated on the item(s) necessary to be inputted. Alternatively, with provision of a device, such as collecting or locating the items needed to be inputted at or on an edge portion of the screen, so as to reduce an amount of movement of a cursor, the operability or usability by the evaluator can be increased up.

FIG. 4 shows an other example of the input screen of the present evaluation system. Also with the present screen, it is possible to use the same one in the both systems which are shown in the above FIGS. 1 and 2.

As the other input information in the present evaluation system, they include the number and/or the name of the product to be evaluated and/or the parts constructing the assembly thereof, and the length, the mass, the number of parts, position (i.e., a high position, a low position, or a regular or ordinary position, etc.), an operation factor mark, a repair factor mark, etc. As to the means for increasing the operability or usability by the evaluator up, it can be said that the similar as was mentioned in the FIG. 3 can be applied to, equally.

FIG. 5 shows an example of the operation factor marks, as an example of the input information in the present evaluation system, and FIG. 6 an example of the repair factor mark, in the same manner thereto. Those indicates the examples of evaluation, wherein the evaluation is executed on the assembling or disassembling of the products or the parts constructing the assembly thereof, on the basis of the moving operation as shown in the FIG. 5, and they are repaired under the condition as shown in the FIG. 6 to be evaluated.

In the present evaluation system, as is shown in the FIGS. 5 and 6, the input information is coded. As a means of the coding thereof, for example, the operation of moving of the part in the lower direction is coded by "$\downarrow$" or "V", the operation of moving thereof in the horizontal direction is coded by "$\rightarrow$" or "-+", for example, by attaching the marks from which the evaluator can easily image the operation, thereby the operability or usability is increased up.

And, the fact that the input information is coded means the information to be transmitted can be reduced down in the amount thereof, in the mode of the embodiment according to the present evaluation system, wherein the input information is transmitted from the evaluator system 11 through the network to the evaluation calculation system 17, so as to execute the calculation and so on, thereby enabling to improve an efficiency of the whole system.

Also in the present evaluation system, as is shown in the FIG. 5, the information relating to the movement and the information relating to tools or jigs are inputted as the operation factors. This is, because they are suitable for a means to express or indicate the characteristics of the part, as an object of the evaluation, in particular in the evaluation system. With the information relating to the movement, i.e., only with the information of the direction of movement, but it is impossible maintain an accuracy of the evaluation, since the information is omitted on the difficulty in using the tool(s) or jig(s) to be used. Further, only with the information relating to the tools or jigs, since the information is omitted on the direction thereof in using them, also it is impossible to maintain a sufficient accuracy of the evaluation. However, with using the both information relating to the movement and the information relating to the tools or jigs, it is possible to maintain the sufficient accuracy for the evaluation system, if adding quantitative information, such as the length and/or area of movement, the mass of the object of movement, etc., other than those.

Here, if the number of the operation factors is too much, extraction and/or selection thereof comes to be difficult, otherwise if it is too small, many cases occurs where it is difficult to express or indicate the operation with an appropriateness thereof. As the number of factors for expressing the operation, the number of roughly about twenty (20) or more or less is appropriate, and preferably from 15 to 25, for example.

As an example of an evaluation algorithm which uses those input information, it may be one for evaluating each of the constructive parts, as the objects of evaluations, upon the basis of the difficulty in assembling, machining or processing, or disassembling thereof, etc., (as an example of the operation, please see the FIG. 5). Namely, it may be possible to be one as far as that makes an evaluation on the basis of the total number of the points of the evaluation that the evaluation object has, by setting the point to be large or small in an order of the difficulties on the respective operations. For example, it may be one in which the evaluation point in each of the operations is subtracted from point 100. And, the accuracy in evaluation can be further improved by an algorithm, in which the each operation mentioned above is compensated depending upon the necessity, in accordance with a compensation condition when conducting that operation (an example of the compensation condition, please see FIG. 6), therefore is preferable.

Namely, if it is the algorithm for conducting the evaluation upon the basis of the difficulty on the operations, it is possible to use the marks described in the FIG. 5, and if it is the algorithm for conducting the evaluation by compensating the difficulty of the operations with the condition of tools or jigs to be used and so on, it is possible to use the marks described in the FIG. 6.

Further, when setting the difficulty of the operations, the accuracy in evaluation can be improved without increasing the number of the factors with which the operations are expressed, not only by setting the difficulty on the operations by each, but also setting the difficulty of the operations when they are combined in plural.

When setting the combination of the operations, the evaluation accuracy can be further improved by setting, not only the examples of the operations described in the FIG. 5, but also the examples described in the FIG. 6, as an object of the combination.

Figure 7:
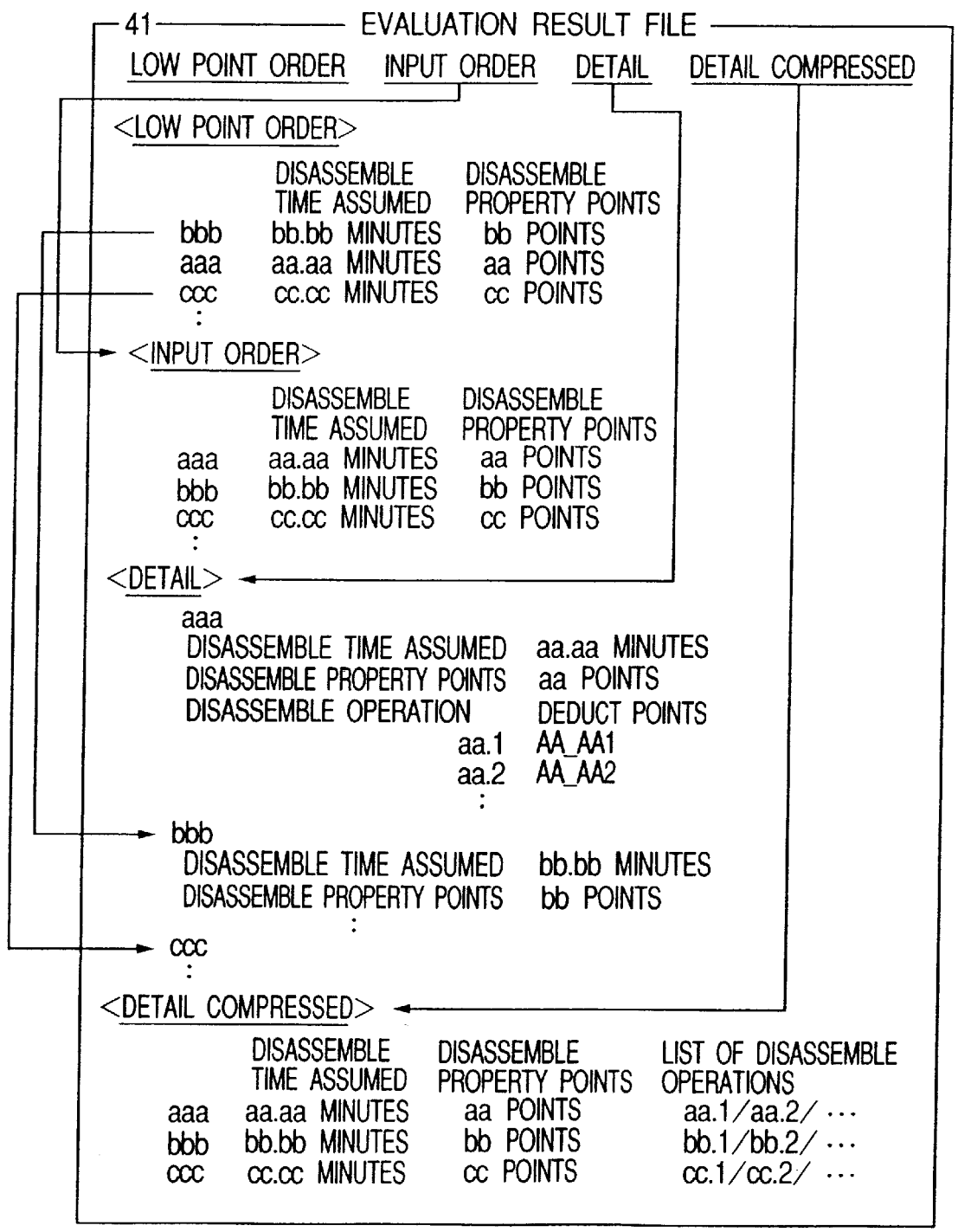
FIG. 7 shows an example of file structure of an evaluation result, according to the present invention.

FIG. 7 shows an embodiment of the structure of an output file in the present evaluation system. Further, with this file structure, the similar one can be used in the both systems shown in the FIGS. 1 and 2.

Herein, an evaluation result file 41 is a file which is produced in the evaluation calculation system 17, and in which a plural number of different evaluations are stored as one (1) file, and it includes, for example, a low point order output for indicating the evaluations in the order from lower point thereof, an input order output for indicating the parts in the order of the input thereof, an a detail format output for indicating the detailed information thereof, and a compressed detail format for indicating the detailed information in compact. Here, arrows in the figure indicates that the information is connected in the directions thereof, and here is indicated that, for example, when "Detail" is selected by clicking with the mouse 13, the indication is shifted or moved to the "Detail" located in the middle portion of the figure, while when "bbb" in the "Low Point Order" in the figure is selected by clicking with the mouse 13, the indication is shifted or moved into the "bbb" within the "Detail" in the figure.

As a means for realizing or achieving such the function, there can be consider a method, which has an information indicating the position of the tip of the arrow, such as a line number, etc., indicative of the position within the file, for instance within the "Detail" in the upper portion of the figure, or a method, in which a specific name, such as "Tip of An Arrow of Detail", is given to the "Detail" lying in the middle portion of the figure, while in the "Detail" is contained the information of moving to the location of the "Tip of An Arrow of Detail", etc.

Figure 8:
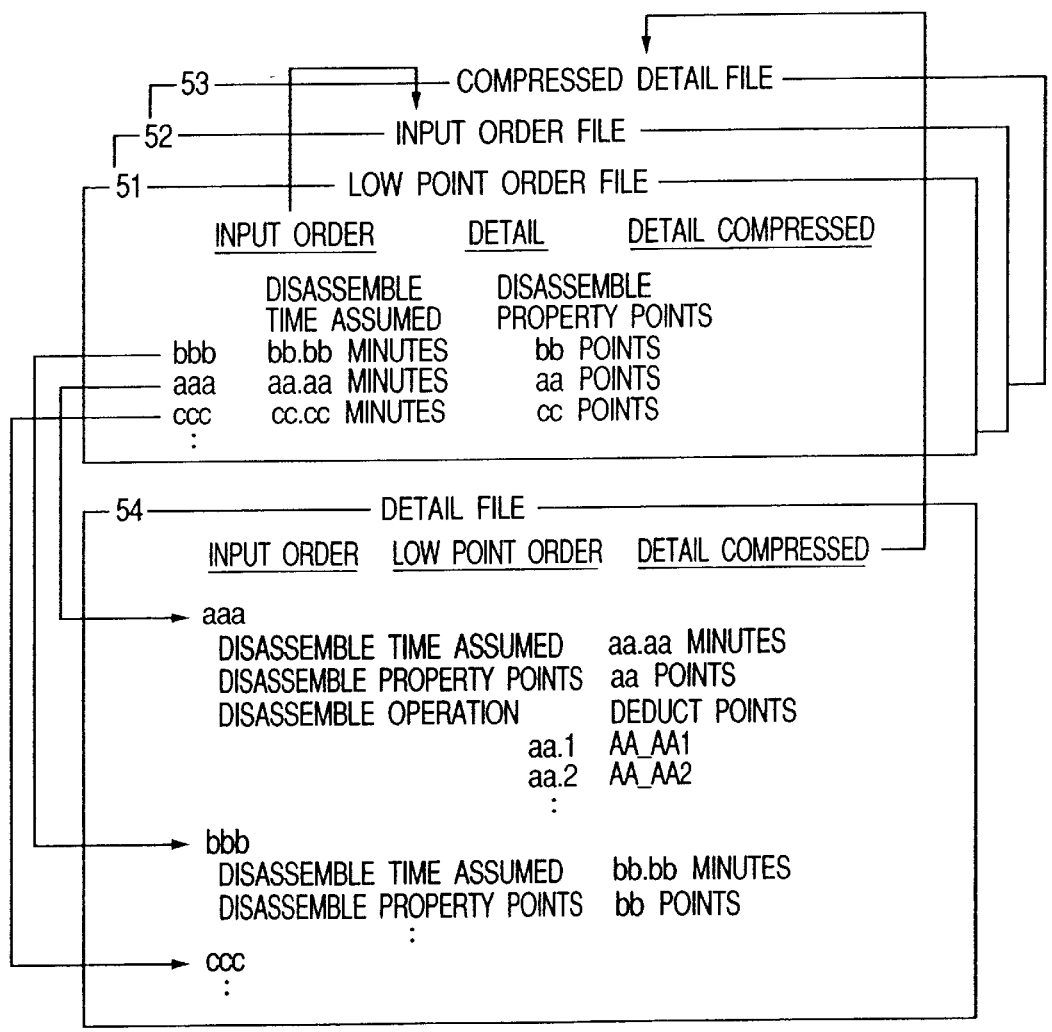
FIG. 8 shows an example of file structure of an evaluation result, according to the conventional art.

In the technology of the conventional art, as shown in FIG. 8, the output results indicating the different contents, such as, a low point order file 51, a input order file 52, a compressed detail file 53, and a detail file 54, etc., are divided into a plural number of files so as to be stored, and those files are indicated by changing over the files depending upon the requirement made by the evaluator or from the evaluation system. Herein, the arrows in the figure indicates that the information is connected in the directions thereof, and it indicates that, for example, when the order of input of the low point order file 51 is selected by click of the mouse 13 or the like, the indication is moved to the input order file 52, while when the "bbb" of the low point order file 51 is selected by click of the mouse 13 or the like, the indication is moved to the "bbb" of the detail file 54. Further, as a means for realizing this function, there can be consider a method, which has an information indicating the position of the tip of the arrow, for example, an information indicative of the detail file 54, such as the file name thereof, in the "Detail" in the upper portion of the low point order file 51. Also, there can be considered a method, for example, in which within the "bbb" of the low point order file 51 is contained an information indicative of the tip position of the arrow within the file, such as the line number, etc., for example, in addition to the information indicative of the detail file 54, such as the file name, etc., or a method, in which a specific name, such as "bbb of Detail", is given to the "bbb" within the file of the detail file 54, while in the "bbb" of the low point order file 51 is contained the information of moving to the position of the "bbb of Detail", etc.

By the way, in a case where a method of using a plural number of files of the conventional type, as shown in the FIG. 8, is applied into the evaluation system using the network 23, the transmission of the file through the network 23 is necessary every time when the requirement thereof is made by the evaluator and/or from the evaluation system, therefore there is a problem that the time of using or occupying the network 23 is increased up. Also, the plural number of files are necessary for the results of evaluation calculations in the evaluation calculation system 17, and it is difficult to determine or specify the timing of deletion of those files, therefore there is a possibility of causing a problem from a view point of maintaining the secrecy thereof.

Then, according to the file storing method which is applied into the present system shown in the FIG. 7, it is possible to handle or treat the evaluation results as one (1) file, collectively, and it is possible to inspect the plural output results having different contents, freely, without the necessity of the network 23, for instance, after completing the transmission thereof once, and further it is also possible to delete the evaluation result file just after the completion of transmission thereof, since there is no necessity of storing the evaluation result file temporarily within the evaluation calculation system 17, if the transmission is completed once, therefore there can be expected an improvement thereof in the view point of keeping secrecy.

According to the present invention, it is possible for the evaluator to execute the evaluation upon the basis of the newest calculation algorithm and calculation data, and for a manager thereof, even in a case where there are the plural number of users of the evaluation system, it is net necessary to conduct the renewal on the user's system, respectively, therefore it is possible to obtain an effect, being same to that the systems of all the evaluators are renewed, only by the renewal of the evaluation calculation system.

What is claimed is:

1. A method for performing an evaluation to determine a percent a product is defective through a network, comprising the steps of:

receiving an information relating to the product to be evaluated and an information relating to parts constructing said product to be evaluated from a terminal at an evaluator side;

outputting an evaluation value through a calculation to determine a percent a product is defective based on said information relating to the product to be evaluated and said information relating to the parts constructing said product to be evaluated;

outputting plural number of different output order lists based on said evaluation value of the calculation to determine the percent the product is defective; and transmitting said plural number of different output order lists which are linked to each other and stored in one file to the terminal at the evaluator side.

2. A method according to claim 1, wherein said information relating to the parts constructing said product to be evaluated includes an information relating to an operation and an information relating to a tool to be used, when said part is assembled.

3. A method according to claim 2, wherein said information relating to the parts constructing said product to be evaluated includes a compensation information relating to the operation and a compensation information relating to the tool to be used, when said part is assembled.

4. A method according to claim 2, wherein said information relating to the parts constructing said product to be evaluated includes information relating to a plurality of the operations and an information relating to a plurality of the tools to be used, when said part is assembled.

5. A method for performing an evaluation to determine an easiness of manufacturing a product through a network, comprising the steps of:

receiving an information relating to the product to be evaluated and an information relating to parts constructing said product to be evaluated from a terminal at an evaluator side;

outputting an evaluation value through a calculation to determine an easiness of manufacturing a product based on said information relating to the product to be evaluated and said information relating to the parts constructing said product to be evaluated;

outputting plural number of different output order lists based on said evaluation value of the calculation to determine the easiness of manufacturing a product; and transmitting said plural number of different output order lists which are linked to each other and stored in one file to the terminal at the evaluator side.

6. A method according to claim 5, wherein said information relating to the parts constructing said product to be evaluated includes an information relating to an operation and an information relating to a tool to be used, when said part is assembled.

7. A method according to claim 6, wherein said information relating to the parts constructing said product to be evaluated includes a compensation information relating to the operation and a compensation information relating to the tool to be used, when said part is assembled.

8. A method according to claim 6, wherein said information relating to the parts constructing said product to be evaluated includes information relating to a plurality of the operations and an information relating to a plurality of the tools to be used, when said part is assembled.

9. A method for performing an evaluation to determined a recycling property of a product through a network, comprising the steps of:

receiving an information relating to the product to be evaluated and an information relating to parts constructing said product to be evaluated from a terminal at an evaluator side;

outputting an evaluation value through a calculation to determine a recycling property of the product based on said information relating to the product to be evaluated and said information relating to the parts constructing said product to be evaluated;

outputting plural number of different output order lists based on said evaluation value of the calculation to determined the recycling property of product; and transmitting said plural number of different output order lists which are linked to each other and stored in one file to the terminal at the evaluator side.

10. A method according to claim 9, wherein said information relating to the parts constructing said product to be evaluated includes an information relating to an operation and an information relating to a tool to be used, when said part is disassembled.

11. A method according to claim 10, wherein said information relating to the parts constructing said product to be evaluated includes a compensation information relating to the operation and a compensation information relating to the tool to be used, when said part is disassembled.

12. A method according to claim 10, wherein said information relating to the parts constructing said product to be evaluated includes information relating to a plurality of the operations and an information relating to a plurality of the tools to be used, when said part is disassembled.

* * * * *